(12) United States Patent
Tippl

(10) Patent No.: US 12,304,307 B2
(45) Date of Patent: May 20, 2025

(54) MOTOR VEHICLE

(71) Applicant: Dr. Ing. h.c. F. Porsche Aktiengesellschaft, Stuttgart (DE)

(72) Inventor: Mike Tippl, Böblingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 282 days.

(21) Appl. No.: 17/944,268

(22) Filed: Sep. 14, 2022

(65) Prior Publication Data

US 2023/0129216 A1    Apr. 27, 2023

(30) Foreign Application Priority Data

Oct. 27, 2021  (DE) ..................... 10 2021 127 962.3

(51) Int. Cl.
    *B60K 35/00*    (2024.01)
(52) U.S. Cl.
    CPC .......... *B60K 35/00* (2013.01); *B60K 2360/21* (2024.01); *B60K 2360/332* (2024.01); *B60K 2360/338* (2024.01)
(58) Field of Classification Search
    CPC .. B60K 2360/338; B60K 35/21; B60K 35/28; B60K 35/285; B60Q 3/78; G08G 1/19623
    See application file for complete search history.

(56) References Cited

FOREIGN PATENT DOCUMENTS

| DE | 102016009238 A1 | | 2/2017 |
| KR | 20210072184 A | * | 6/2021 |
| WO | WO-2019166102 A1 | * | 9/2019 |

OTHER PUBLICATIONS

English translation KR 20210072184 A (Year: 2021).*

* cited by examiner

*Primary Examiner* — Mariceli Santiago
(74) *Attorney, Agent, or Firm* — Buchanan Ingersoll & Rooney PC

(57) ABSTRACT

A motor vehicle comprising a camera, a controller, and a lighting device arranged in an interior of the motor vehicle. The lighting device is a light strip configured to emit light in different color tones. The camera is configured to create images and/or videos of an environment of the motor vehicle and to output the images and/or videos to the controller. The controller is configured to recognize, from the images and/or videos, a color tone displayed by a light signal system in the environment of the motor vehicle. The controller is configured to cause the lighting device to emit light in the displayed color tone.

16 Claims, 1 Drawing Sheet

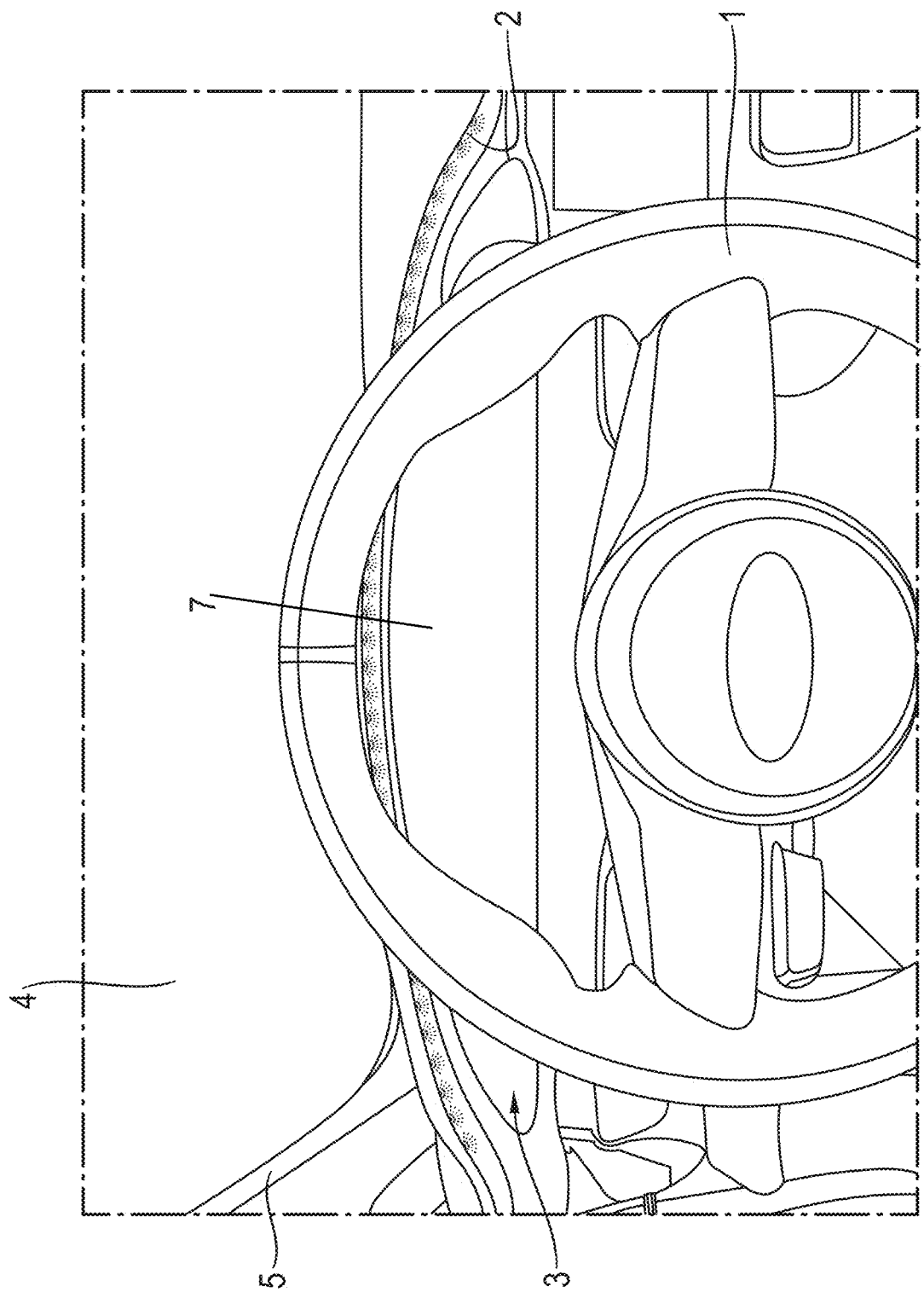

MOTOR VEHICLE

CROSS-REFERENCE TO RELATED APPLICATION

This application claims priority to German Patent Application No. 10 2021 127 962.3, filed Oct. 27, 2021, the content of such application being incorporated by reference herein in its entirety.

FIELD OF THE INVENTION

The present invention relates to a motor vehicle.

BACKGROUND OF THE INVENTION

DE 10 2016 009 238 A1, which is incorporated by reference herein, discloses a motor vehicle with a camera that is used to capture a display rendered by a light signal system. This display is then shown on a display device in the motor vehicle.

SUMMARY OF THE INVENTION

In contrast, the present invention relates to making the display displayed by the light signal system easier and faster to capture for the driver of the motor vehicle.

The motor vehicle comprises a camera, a control means, and a lighting means arranged in an interior of the motor vehicle. The lighting means is designed to emit light in different color tones. In the context of this description, the term "color tone" in particular refers to light that can be referred to with one word, for example green, yellow, orange, or red. The camera is designed to create images and/or videos of an environment of the motor vehicle and to output the images and/or videos to the control means. The control means may be or form part of a computer having a processor, memory and software for executing a particular program. The control means, which may also be referred to herein as a controller, is designed to recognize, from the images and/or videos, a color tone displayed by a light signal system in the environment of the motor vehicle. The control means is designed to cause the lighting means to emit light in the displayed color tone. It should be noted that the color of the light emitted by the lighting means may deviate from or be identical to the color of the light emitted by the light signal system. Rather, it is critical that the color tone, e.g., green, yellow, orange, or red, be the same or similar.

According to aspects of the invention, it is provided that the lighting means is designed as a light strip. The lighting means could also be a single light. This has the result that it can be laid over a relatively large area in the motor vehicle and can thus be seen by the driver in a relatively large viewing angle. The driver can thus perceive the color tone of the lighting means, even if the driver does not actually look directly at the lighting means. The driver is thus informed of the color tone of the light signal system when the driver is actually engaged in something else and, for example, looks at a screen of the dashboard of the motor vehicle.

According to one embodiment of the invention, the light strip may comprise LEDs as the light source. For example, it may comprise a first LED designed to emit light in a first color tone, a second LED designed to emit light in a second color tone, and a third LED designed to emit light in a third color tone.

According to one embodiment of the invention, the light strip may have a length of more than 20 cm. Such a relatively long strip can be recognized particularly well by the driver of the motor vehicle, even if the driver is actually engaged with something else.

According to one embodiment of the invention, the motor vehicle may comprise a steering wheel and a windshield. The light strip can in this case be arranged between the steering wheel and the windshield. This area is particularly advantageous for the light strip to be perceived since it is directly in front of the driver. For a passenger, on the other hand, the light strip in this area is not very noticeable so that it does not distract the passenger and does not overly affect the overall visual impression in the interior of the motor vehicle. For the passenger, the information about the color tone displayed by the light signal system is also less important.

According to one embodiment of the invention, the motor vehicle may comprise a dashboard. The light strip may be arranged in an upper end region of the dashboard. In the context of this description, the term "dashboard" in particular refers to the entirety of many instruments that are arranged next to and above one another and indicate, for example, information about the motor vehicle or a planned or already traveled route. In the context of this description, the term "upper end region" in particular refers to an upper end of the dashboard with a height of less than 5 cm. The arrangement of the light strip in this region is particularly advantageous for the driver to perceive the light strip when the driver looks at instruments of the dashboard, for example.

According to one embodiment of the invention, the light strip may be arranged in a curved manner. In particular, the light strip may have a curvature in a vertical direction. This is in particular advantageous if, for example, the upper end region of the dashboard likewise has a curvature. The shape of the light strip may then be adapted to the shape of the upper end region.

According to one embodiment of the invention, the motor vehicle may comprise a screen arranged in the dashboard. The light strip may be arranged above the screen. This is in particular advantageous so that the driver is informed of the color tone of the light signal system when the driver, for example, looks at the screen because information about the motor vehicle or about a planned or already traveled route is displayed there.

According to one embodiment of the invention, the light strip may have its greatest extension in a transverse direction of the motor vehicle. In the context of this description, the term "greatest extension" in particular refers to the length. In the context of this description, the term "transverse direction of the motor vehicle" in particular refers to a direction that is horizontal during the intended use of the motor vehicle and that is perpendicular to the longitudinal direction. The longitudinal direction is the direction in which the motor vehicle is intended to travel without any steering angle.

The large extension in the transverse direction is in particular advantageous for good visibility of the light strip in a large viewing angle of the driver. For example, the light strip may be perceived when the driver looks out a side window, through the windshield, or at the dashboard.

According to one embodiment of the invention, the light strip may have a first end point arranged in a transverse direction of the motor vehicle between the steering wheel and a center console or arranged to overlap the center console or the steering wheel in the transverse direction. From this first end point, the light strip may extend toward a second end point of the light strip. In the context of this description, the formulation "overlap in the transverse direction" is in particular understood to mean that the respective elements are arranged in front of or behind one another in the longitudinal direction without offset in the transverse direction. The formulation "in the transverse direction between" in the context of this description is in particular understood to mean that an offset may be present in the longitudinal direction between the mentioned elements.

According to one embodiment of the invention, the second end point may be arranged in a transverse direction of the motor vehicle between the steering wheel and an outer end region of the dashboard or arranged to overlap the outer end region or the steering wheel in the transverse direction. The term "outer end region" in the context of this description refers to a region where the dashboard ends in the transverse direction. For example, the outer end region may be below an A-pillar of the motor vehicle.

BRIEF DESCRIPTION OF THE DRAWINGS

Further features and advantages of the present invention become apparent from the following description of a preferred exemplary embodiment with reference to the appended illustration. The same reference signs are used for the same or similar features and for features with the same or similar functions. Shown are:

FIG. 1 is a schematic view of a section of an interior of a motor vehicle according to an embodiment of the invention.

DETAILED DESCRIPTION OF THE INVENTION

The motor vehicle comprises a steering wheel 1, a light strip 2, a dashboard 3, and a windshield 4. The light strip 2 is arranged in an upper end region of the dashboard 3 at a location above a screen 7 of the dashboard 3, and between the steering wheel 1 and the windshield 4. FIG. 1 is a view of the interior from the driver's perspective. The light strip 2 extends from below an A-pillar 5 of the motor vehicle to an end point of the light strip 2, which overlaps a center console in the transverse direction.

A control means causes the light strip 2 to emit light in the color tone in which a light signal system in the environment of the motor vehicle also emit lights. In the process, the color tone of the light signal system is captured by the camera and output to the control means. If the driver observes the environment through the windshield 4 but not a light signal system in this environment, the light strip 2 is in the driver's field of view so that the driver notices a change of the color tone 2, even if the driver does not concentrate on the light strip 2. The same applies if the driver looks at an instrument of the dashboard 3 and, for example, retrieves information about the motor vehicle or adjusts the settings. Even when looking through a side window of the motor vehicle, the driver can notice a change in the color tone of the light strip 2.

The arrangement of the light strip 2 is thus particularly advantageous since the driver can notice a change in the color tone of the light strip 2 both when looking outside and when looking at the dashboard 3. This results on the one hand from the position of the light strip 2 between the steering wheel 1 and the windshield 4 and on the other hand from the size of the light strip 2, which extends in the transverse direction from an outer end region of the dashboard 3 to an overlap with the center console. It is furthermore advantageous that the light strip 2 is less noticeable to a passenger in the motor vehicle so that it has a minor effect on the visual impression of the interior of the motor vehicle from the viewing angle of the passenger.

What is claimed is:

1. A motor vehicle comprising:
a camera, a controller, and a light strip arranged in an interior of the motor vehicle,
wherein the light strip is configured to emit light in different color tones,
wherein the camera is configured to create images and/or videos of an environment of the motor vehicle and to output the images and/or videos to the controller,
wherein the controller is configured to recognize, from the images and/or videos, a color tone displayed by a light signal system in the environment of the motor vehicle,
wherein the controller is configured to cause the light strip to (i) emit light in a first displayed color tone that matches a first color tone displayed by the light signal system, and (ii) emit light in a second displayed color tone that matches a second color tone displayed by the light signal system, wherein the first and second displayed color tones are different color tones.

2. The motor vehicle according to claim 1, wherein the light strip comprises LEDs as a light source.

3. The motor vehicle according to claim 1, wherein the light strip has a length of more than 20 cm.

4. The motor vehicle according to claim 1, wherein the motor vehicle comprises a steering wheel and a windshield, wherein the light strip is arranged between the steering wheel and the windshield.

5. The motor vehicle according to claim 1, wherein the motor vehicle comprises a dashboard, and the light strip is arranged in an upper end region of the dashboard.

6. The motor vehicle according to claim 1, wherein the light strip is arranged in a curved manner.

7. The motor vehicle according to claim 1, wherein the motor vehicle comprises a screen arranged in the dashboard, wherein the light strip is arranged above the screen.

8. The motor vehicle according to claim 1, wherein the light strip extends in a transverse direction of the motor vehicle.

9. The motor vehicle according to claim 1, wherein the light strip comprises a first end point which is arranged in a transverse direction of the motor vehicle between a steering wheel and a center console or is arranged to overlap the center console or the steering wheel in the transverse direction and extends from the first end point toward a second end point of the light strip.

10. The motor vehicle according to claim 9, wherein the second end point is arranged in the transverse direction of the motor vehicle between the steering wheel and an outer end region of the dashboard or is arranged to overlap the outer end region or the steering wheel in the transverse direction.

11. The motor vehicle according to claim 1, wherein the controller is configured to cause the light strip to emit light in four different displayed color tones including green, yellow, orange and red.

12. The motor vehicle according to claim 1, wherein the first and second displayed color tones are red and green, respectively.

13. The motor vehicle according to claim 12, wherein the controller is configured to cause the light strip to successively emit light in the first displayed color tone and then the second displayed color tone.

14. The motor vehicle according to claim 1, wherein a center of the light strip is aligned with a center of a steering wheel of the motor vehicle.

15. The motor vehicle according to claim 14, wherein the light strip extends between a first end point and a second end point, wherein, as viewed in a transverse direction of the motor vehicle, the first end point of the light strip is arranged at a location that is between one side of the steering wheel and a center console of the motor vehicle, and the second end point of the light strip is arranged on an opposite side of the steering wheel.

16. The motor vehicle according to claim 1, wherein the light strip is centered relative to a driver of the motor vehicle.

\* \* \* \* \*